Figure 1:
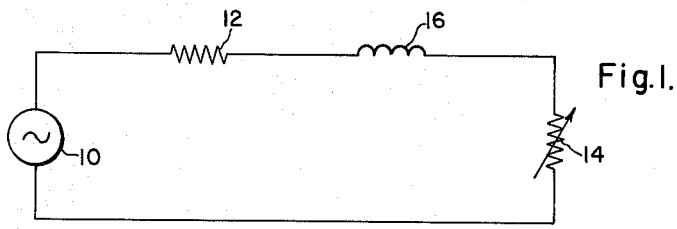

Sept. 28, 1965     E. J. BORREBACH     3,209,060
ELECTRICAL APPARATUS

Filed June 12, 1963                                                          3 Sheets-Sheet 1

WITNESSES
Theodore F. Wrobel
James F. Young

INVENTOR
Edwin J. Borrebach
BY Donald R. Lackey
ATTORNEY

Sept. 28, 1965   E. J. BORREBACH   3,209,060
ELECTRICAL APPARATUS
Filed June 12, 1963   3 Sheets-Sheet 2

United States Patent Office 3,209,060
Patented Sept. 28, 1965

3,209,060
ELECTRICAL APPARATUS
Edwin J. Borrebach, Monroeville, Pa., assignor to Westinghouse Electric Corporation, Pittsburgh, Pa., a corporation of Pennsylvania
Filed June 12, 1963, Ser. No. 287,402
8 Claims. (Cl. 13—13)

This invention relates in general to electrical regulating systems and more particularly to regulating systems for electric arc furnace control.

Regulating systems of the prior art for direct arc and submerged arc electric furnaces generally are responsive to arc voltage and arc current, or in the case of submerged arc furnaces, frequently to arc current alone. In the direct arc furnace, the position of an electrode relative to the charge is controlled by a regulator so that the distance between the electrode and charge produces an arc having the desired heating effect. In the submerged arc furnace, the depth of electrode penetration into the charge is controlled by a regulator to produce a plurality of arcs between the electrode and charge having the desired heating effect.

Controlling the position of the electrode by maintaining a certain ratio between the arc voltage and arc current, which is called an impedance regulator, is the type of regulator generally utilized with a direct arc electric furnace. However, this type of regulator has some disadvantages. For example, when the supply voltage fluctuates or changes, the regulator will make a corresponding linear change in the electrode current. The arc power, however, which is the quantity that is desired to be held constant does not change in a linear manner with voltage fluctuations, but changes with the square of the voltage change, and thus changes in spite of the attempts of the regulator to maintain a certain relationship between the arc current and arc voltage. Also, the circuit impedance, exclusive of the arc impedance, differs for each electrical phase of the furnace, so operation of the furnace with the same voltage and current magnitude per phase does not result in equal power input per phase.

In submerged arc furnaces, regulators responding to electrode current and electrode-to-shell voltage do not always position the electrode at the desired or optimum penetration into the charge. The optimum operating condition for a submerged arc furnace is the maximum electrode penetration into the charge which produces the desired power input into the charge and thus the desired heating effect. It is common for regulators for submerged arc furnaces to be designed to respond only to arc current. However, when the regulator is designed to respond to variations in arc current only, it would be possible to have the phase currents substantially balanced but at the same time have a considerable difference in the arc voltages. The resulting unequal distribution of power between electrical phases would prevent desirable furnace operation. Therefore, in regulators for submerged arc furnaces, as well as regulators for direct arc furnaces, it is desirable to regulate the position of the electrodes by an indication of furnace power at each electrode.

Although the power input to a submerged or direct arc furnace is the most desirable value to regulate, a furnace input power signal alone cannot be used, especially in the case of the direct arc furnace, because the furnace power increases with increasing furnace KVA only to a certain point, beyond which point the furnace power decreases with increasing current. This is not too great a problem with submerged arc furnaces because they operate at a KW level substantially below the peak of their furnace KW curve. On the other hand, direct arc furnaces operate near the peak of their furnace KW curve. Since most furnace users have KVA demand clauses in their electric power agreements, operation of the furnace at high KVA but low watt level would burden the user with power costs out of proportion to useful energy consumed. It is, therefore, desirable to regulate and maintain the optimum electrode position in an electric arc furnace using furnace input power as a control signal, but the operation should be confined to that portion of the circuit KW curve where an increase in furnace input KVA causes the furnace power input to increase. Further, the regulating system for regulating the position of an electrode in a direct arc furnace must have means for insuring that the furnace does not operate with the electrode shorted to the charge. This feature is not required in the submerged arc furnace, as in this type furnace the essence of its operation requires the electrodes to be submerged in the charge.

Accordingly, it is an object of this invention to provide a new and improved regulator system for electric arc furnaces.

Another object of this invention is to provide a new and improved regulator system that utilizes a signal proportional to power as the regulating signal.

A further object of this invention is to provide a new and improved arc furnace regulator system for direct arc and submerged arc furnaces that utilizes a signal proportional to the arc furnace input power to regulate and maintain the position of the furnace electrodes.

Another object of this invention is to provide a new and improved regulating system that will restrict the operation of the arc furnace to the operating range where an increase in furnace input current causes an increase in useful furnace input power.

Another object of this invention is to provide a new and improved regulating system for direct arc electric furnaces that will immediately raise the electrode when the electrode becomes shorted to the charge.

Briefly, the present invention accomplishes the above-cited objects by providing a regulating system that is responsive to a signal proportional to the furnace input power and has a supplementary overriding current control that prevents operation of the furnace in the undesirable range hereinbefore referred to. In addition to the above, the regulator for the direct arc furnace has means for obtaining a voltage signal to raise the electrode in the event the electrode makes physical contact with the charge. More specifically, the regulator system employs a solid state multiplying device that provides a voltage output proportional to the dot product of the furnace voltage and furnace current. This signal is, therefore, proportional to the furnace input power and is used to regulate the electrode position by comparing this signal with a reference signal. Any difference between the two signals is used as an error signal which positions the electrode accordingly. The supplementary control overrides the error signal at arc current magnitudes in excess of a preset value and returns the electrode to a position that will allow the error signal to again control the electrode position. The regulator for the direct arc furnace has a voltage circuit which will cause the electrode to raise when the electrode shorts to the charge.

Further objects and advantages to this invention will become apparent as the following description proceeds and features of novelty which characterize the invention will be pointed out in particularity in the claims annexed to and forming a part of this specification.

Figure 2:
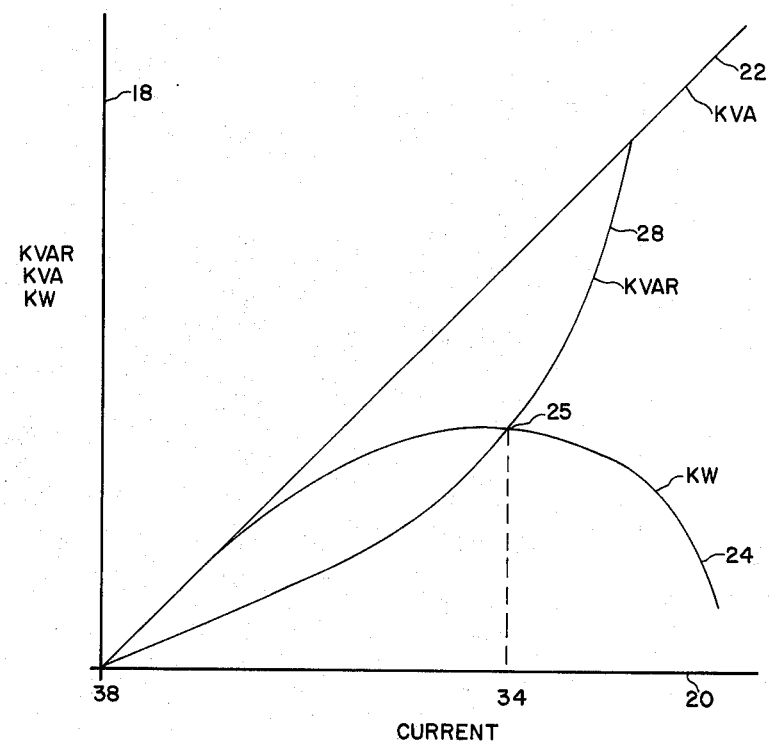
Figure 3:
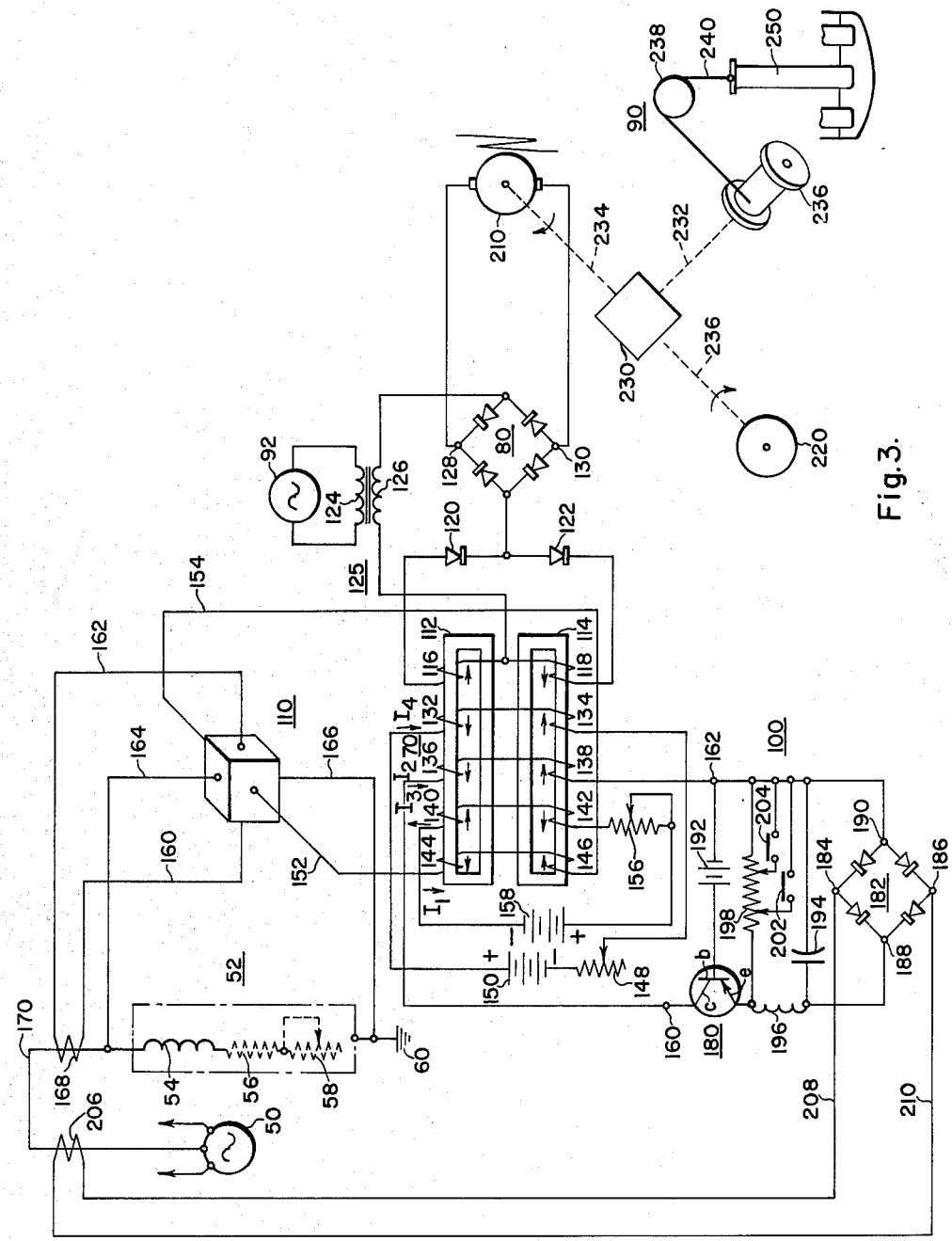
Figure 4:
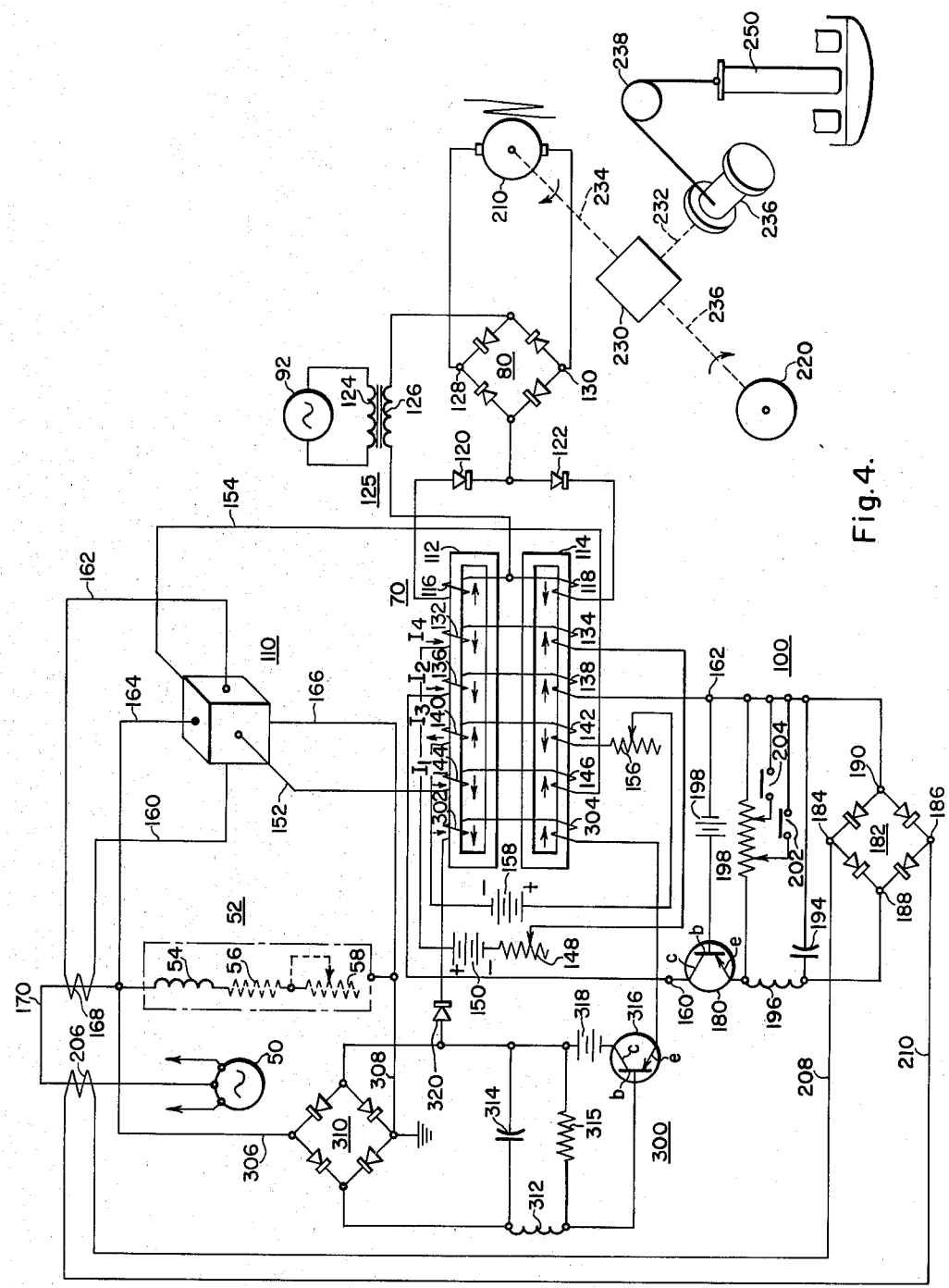

For a better understanding of the invention, reference may be had to the accompanying drawings in which:

FIGURE 1 illustrates the basic electrical circuit of an electric arc furnace;

FIG. 2 graphically shows the general circuit characteristics of an electric arc furnace;

FIG. 3 shows a simplified diagrammatic representation of submerged arc electric furnace and control system illustrating an embodiment of the invention; and FIG. 4 shows a simplified diagrammatic representation of a direct arc electric furnace and control system illustrating another embodiment of the invention.

The basic electrical circuit of an electric arc furnace, as illustrated in FIG. 1, consists generally of an electrical power source 10, circuit resistance 12, arc resistance 14 and the circuit inductance 16. The arc resistance 14 is variable, with the resistance decreasing as arc current is increased. In a direct arc furnace, the arc current increases when the electrode is brought closer to the charge, and in a submerged arc furnace the arc current increases as the penetration of the electrode into the charge increases. As the arc current is increased, the arc resistance 14 decreases and the circuit inductance 16, which remains constant, comprises a proportionately greater share of the circuit impedance, causing the circuit power factor to become more lagging. In the case of the submerged arc furnace this power factor change is minor and seldom presents any problem. In the case of the direct arc furnace, however, the power factor change is substantial, with the circuit power in kilowatts increasing with arc current until the circuit power factor becomes so lagging that a further current increase actually causes a decrease in circuit kilowatts. This is graphically shown in FIG. 2. FIG. 2 illustrates the typical curves of arc furace KVA, furnace input KW and KVAR vs. furnace current for a selected furnace voltage. The furnace KVA, KW and KVAR are plotted on the ordinate 18 and furnace current is plotted on the abscissa 20. As the furnace current increases, the slope of the circuit KVA curve 22 is constant, while the circuit KW curve 24 increases to point 25 and starts to decrease. The circuit KW curve 24 acts in this manner because the circuit KVAR is rapidly increasing with increasing circuit current, as evidenced by circuit curve 28.

Point 25 on circuit KW curve 24 occurs where the circuit KW curve 24 crosses the circuit KVAR curve 28. It is evident from the curves in FIG. 2 that the arc furnace should operate over the range from point 38 to point 25 on the circuit KW curve 24. Operation of the furnace past point 25 on circuit KW curve 24 will result in a reduction of circuit kilowatts but an increase in circuit KVA. To prevent operation in the undesirable portion of the circuit kilowatt curve 24, furnace current 34 should not be exceeded.

FIG. 3 shows schematically an embodiment of the invention suitable for use with the submerged arc type of furnace. The regulator shown in FIG. 3 will regulate the operation of a submerged arc furnace over the desired portion of the circuit KW curve 24 and if the maximum preset current 25 is exceeded, the distance the electrode has penetrated into the charge or molten pool of metal will be automatically adjusted to bring the furnace current back into the control range from point 38 to 25. Although, as hereinbefore stated, this overriding control may not be necessary on a regulator for a submerged arc furnace, since a submerged arc furnace normally operates well below the peak of its KW curve, there is a chance the furnace may try to operate at a current greater than its rated current and is included to prevent such an occurrence.

More specifically, FIG. 3 shows a power supply 50, which may be multiphase as shown, or single phase, disposed to supply electric power to submerged arc furnace 52. For clarity, only one electrode is shown in the furnace 52; however, in practice two or more electrodes are used, with the current flow being between the electrodes. The submerged arc furnace 52 comprises a circuit inductance 54, a fixed circuit resistance 56, and a variable arc resistance 58 connected in circuit relation with power source 50. The furnace shell may be electrically grounded at 60. Amplifying means 70 with its associated control and load windings, provides a signal to rectifying means 80, which in turn supplies unidirectional or direct current power to electrode positioning means 90. Amplifying means 70 is connected in circuit relation between a source of alternating potential 92 and a load circuit comprising the electrode positioning means 90. Amplifying means 70 may be a magnetic amplifier, as shown, an electronic amplifier, an amplifier utilizing semi-conductor devices, or any other amplifying means. Magnetic amplifier 70 provides an output that varies with or is responsive to the watts or power input to electric arc furnace 52, subject to an overriding control provided by limiting circuit 100. The signal proportional to the watts or power input supplied to the magnetic amplifier 70 is provided by a solid state semiconductor multiplying device 110, shown in block form, commonly called a Hall generator, which has the characteristic of supplying a voltage output proportional to the product of two electrical quantities applied to it. Since the Hall generator 110 measures instantaneous voltage and instantaneous current, it takes circuit power factor into consideration and its output is proportional to circuit watts.

The full wave doubler type magnetic amplifier 70 comprises two magnetic core members 112 and 114. The load windings 116 and 118 are disposed in inductive relationship with the magnetic core members 112 and 114, respectively. Self-saturation for the magnetic amplifier 70 is achieved by connecting self-saturating rectifiers 120 and 122 in series circuit relation with the load windings 116 and 118, respectively. The series circuit including the load winding 116 and the self-saturating rectifier 120 is connected in parallel circuit relation with the series circuit including the load winding 118 and the self-saturating rectifier 122, thus forming a doubler circuit of the magnetic amplifier 70. The current flow through load windings 116 and 118 produces a magnetomotive force in magnetic core members 112 and 114 as shown by the arrows.

Transformer 125, having a primary winding 124 responsive to electrical power source 92, and a secondary winding 126, is disposed to supply electrical energy to the load windings 116 and 118 of the magnetic amplifier 70. A full-wave, dry-type load rectifier 80 is connected between the doubler or parallel circuit of the magnetic amplifier 70 and the secondary winding 126 of the transformer 125 in order to produce a unidirectional or direct current output at terminals 128 and 130. Terminals 128 and 130 are in turn connected to the electrode positioning system 90.

The bias windings 132 and 134 are disposed in inductive relation with the magnetic core members 112 and 114 respectively, for the purpose of biasing the magnetic amplifier 70 by a predetermined amount. Specifically, the bias windings 132 and 134 are connected in series circuit relation with each other, the series circuit being connected through an adjusting rheostat 148 to a substantially constant direct current voltage source 150.

In order to render the magnetic amplifier 70 responsive to the output of the solid state multiplying device or watt transducer 110, control windings 144 and 146 are disposed in inductive relation with the magnetic core members 112 and 114, respectively. In particular, the control windings 144 and 146 are connected in series circuit relation with each other, the series circuit being connected between the lines 152 and 154 which are in turn connected to the output of the watt transducer 110.

In order to provide a reference signal for the watt or power signal supplied by the watt transducer 110, windings 140 and 142 are disposed in inductive relation with the magnetic core members 112 and 114, respectively. In particular, reference windings 140 and 142 are connected in series circuit relation with one another, the series circuit being connected through an adjusting rheostat 156 to a substantially constant direct current voltage source 158.

In order to render the magnetic amplifier 70 responsive to the current limiting circuit 100, windings 136 and 138 are disposed in inductive relation with magnetic core members 112 and 114, respectively. In particular, windings 136 and 138 are connected in series circuit relation with each other, the series circuit being connected to output terminals 160 and 162 of current limiting circuit 100.

The control windings 144 and 146 of magnetic amplifier 70 are so disposed on their respective magnetic core members 112 and 114 that when the first input control signal or current $I_1$ from the solid state multiplying device 110 flows therethrough in the direction indicated in FIG. 3, a magnetomotive force is produced in the respective core members that subtracts from the magnetomotive force or ampere turns produced by the current flow through the respective load windings 116 and 118, as also indicated in FIG. 3. Similarly, windings 136 and 138 of the magnetic amplifier 70 are so disposed on their respective magnetic core members 112 and 114 that when the current limiting signal $I_2$ from the limiting circuit 100 flows therethrough in the direction indicated in FIG. 3, a magnetomotive force produced in the respective magnetic core members that also subtracts from the magnetomotive force or ampere turns produced by the current flow through the respective load windings 116 and 118.

The reference windings 140 and 142 are so disposed on their respective magnetic core members that when the current $I_3$ flows through said windings in the direction indicated in FIG. 3, a magnetomotive force is produced in the respective magnetic core members that is additive with respect to the magnetomotive force or ampere turns produced by the current flow through load windings 116 and 118. On the other hand, the bias windings 132 and 134 are so disposed on their respective magnetic core members, that when the current $I_4$ flows through said windings in the direction indicated in FIG. 3, a magnetomotive force is produced in the respective magnetic core members that subtracts from the magnetomotive force produced by current flow through load windings 116 and 118.

If it is assumed as a reference direction, that the direction of an input signal or current is positive when the ampere turns or magnetomotive force produced by the flow of the input signal is additive with respect to the magnetomotive force or ampere turns produced by the flow of current through the respective load windings 116 and 118 thus tending to drive the magnetic core members 112 and 114 toward saturation and increase the output signal of the magnetic amplifier 70, then the direction of the bias signal $I_4$, the watt signal current $I_1$ and limiting current $I_2$ would be negative with respect to the assumed reference direction. The direction of the reference current $I_3$, on the other hand, would be positive with respect to the assumed reference direction.

In the operation of the control of regulator circuit shown in FIG. 3, the output signal of the magnetic amplifier 70 which appears at the output terminals 128 and 130 of the rectifier 80, is responsive to or varies with the algebraic sum or net total of the magnetomotive force or ampere turns produced by the flow of control signals $I_1$ and $I_2$ through the control windings 144 and 146, and windings 136 and 138, respectively.

The solid state multiplying device 110, or Hall generator, provides a voltage output proportional to the product of two instantaneous electrical quantities, i.e., the current passing through it and the circuit voltage perpendicular to it. This characteristic of the solid state multiplying device enables the current and voltage of the circuit to be multiplied, thus obtaining a signal proportional to the watts utilized by the circuit. The solid state multiplying device 110 is connected in circuit relation with the electric arc furnace 52 by virtue of its conductors or leads 160, 162, 164 and 166. Conductors 160 and 162 obtain a signal from the arc furnace 52 proportional to the current flowing through the arc furnace 52. More specifically, leads 160 and 162 are connected to current transformer 168, with said current transformer being disposed in inductive relation with the line 170 which is connected to the arc furnace 52. Conductors 164 and 166 of semiconductor device 110 obtain a signal from the arc furnace 52 proportional to the voltage drop across said arc furnace. Specifically, conductor 164 is connected to line 170 on one side of the arc furnace 52, and lead 166 is connected to ground 60 on the other side of said arc furnace. The output leads 152 and 154 of the semiconductor device 110 deliver a signal proportional to the arc furnace watts to control windings 144 and 146 of magnetic amplifier 70.

As hereinbefore stated, the signal proportional to arc furnace watts, $I_1$, in conjunction with reference signal $I_3$, controls or regulates the arc furnace current over the desirable range, as shown in FIG. 2 from points 38 to 25 on circuit kilowatt curve 24. To prevent furnace operation in the undesirable portion of said curve, extending to the right of point 25 on circuit kilowatt curve 24, and to return the arc furnace to the desirable operating condition, or to prevent the arc furnace from operating past a certain current rating in the event the watt transducer 110 loses control for some reason, or to limit the operation of the furnace to a rating within the current carrying capabilities of the equipment, a supplementary current control is provided that will override the watt control signal $I_1$ at the current values in excess of a preset value. A circuit that may be used to perform this limiting function is shown in FIG. 3 as circuit 100. When the arc furnace current exceeds a preset value, limiting circuit 100 produces a signal at output terminals 160 and 162, which are in turn connected to windings 136 and 138 of magnetic amplifier 70. In the undesirable operating range of the arc furnace 52, the furnace current increases while the arc kilowatts decreases. This decrease in the arc kilowatts reduces the signal $I_1$ from the semiconductor multiplying device 110, which in turn increases the output of magnetic amplifier 70 and signals the electrode positioning means 90 to lower the electrode and decrease the arc gap. This in turn would further increase the furnace current and reduce the arc kilowatts still more and the output of magnetic amplifier 70 would eventually drive the electrode of direct arc type furnace into the melt. To prevent this condition from occurring, when the furnace current reaches a certain value, the limiting circuit 100 produces a signal $I_2$ which produces a magnetomotive force or ampere turns in windings 136 and 138 of magnetic amplifier 70 which are in the same direction as the magnetomotive force or ampere turns produced by the watt signal $I_1$ from the solid state multiplying device 110. The limiting signal $I_2$ reduces the output of the magnetic amplifier 70 and the electrode positioning device raises the furnace electrode until the signal $I_2$ from the limiting circuit 100 ceases. The electrode, in response to the limiting circuit $I_2$ is raised so that control by the watt signal $I_1$ from semiconductor multiplying device 110 is resumed. In other words, the furnace operation is returned to the portion of the circuit kilowatt curve 24 shown in FIG. 2 and illustrated by points 38 to 25.

In general, limiting circuit 100 is comprised of a switching device which may be a PNP junction transistor 180 having a base electrode $b$, collector electrode $c$ and emitter electrode $e$, rectifier means which may be a dry type bridge rectifier 182, a unidirectional voltage source 192 for applying a reverse bias to transistor 180, adjustable resistor 198, coil 196 and capacitor 194 for filtering the unidirectional output of rectifier 182 and means for obtaining a signal proportional to arc furnace current, which may be a current transformer 206.

More specifically, current transformer 206 is diposed in inductive relation with the arc furnace conductor 170, thus obtaining an alternating signal proportional to the arc furnace current. This signal is transmitted to the input terminals 184 and 186 of rectifier 182 by conductors 208 and 210, respectively. Rectifier 182 converts the alternating signal received from current transformer 206 into a unidirectional signal which is proportional to the arc furnace current. The unidirectional signal from rectifier 182 may be filtered by a filter network comprising coil 196 and capacitor 194. The choke or coil 196 is connected between the output terminal 188 of rectifier 182 and the emitter electrode $e$ of transistor 180. The capacitor 194 is connected across the output terminals 188 and 190 of rectifier 182. A reverse biasing unidirectional power supply 192 is connected from the base electrode $b$ of transistor 180 to output terminal 190 of rectifier 186. In order to set the maximum current for different furnace voltages, an adjustable resistor 198 is connected from the emitter electrode $e$ to the output terminal 190 of rectifier 182. A plurality of tap changer contacts, represented by contacts 202 and 204, may be used to set the level at which the limit control starts for different furnace voltages by selecting the proper amount of resistance 198 that should be in the circuit.

In operation, the limiting circuit 100 produces a signal $I_2$ when a preset magnitude of arc furnace current is reached. This signal $I_2$ overrides watt signal $I_1$ produced by the solid state multiplying device 110 and ensures operation of the arc furnace 52 in the desirable range. The amount of resistance 198 in the circuit determinates the point at which the direct current signal produced at terminal 188 and 190 of rectifier 182 overcomes the reverse bias applied to the emitter base circuit of transistor 180 by direct current source 192. When the furnace current, as sensed by current transformer 206, becomes high enough to produce a signal that, when rectified and applied to the emitter base circuit of transistor 180, overcomes the reverse bias applied to said circuit by direct current source 192, the transistor 180 switches from the non-conductive to the conductive state allowing a current $I_2$ to flow through windings 136 and 138 of magnetic amplifier 70. Current $I_2$ produces a magnetomotive force that is additive to the watt signal $I_1$ and reduces the output of the magnetic amplifier 70.

Many different types of electrode positioning means 90 may be used to raise and lower the electrode of arc furnace 170 in response to the signal produced by the magnetic amplifier 70 at the output terminals 128 and 130 of rectifier 80. For example, the ampere turns of reference windings 140 and 142 may be so selected that the difference between the reference signal $I_3$ and the watt signal $I_1$ produces a polarized signal which may be applied to a reversible direct current motor (not shown). Another type that may be used is shown in FIG. 3 and comprises a direct current motor 210, an alternating current motor 220 and a differential 230. The direct current motor 210 is connected to a first input member or shaft 234 of differential 230 and the alternating current motor is connected to a second input member or shaft 236 of differential 230. The motors are disposed relative to their respective shafts to rotate the shafts of the differential 230 in opposite directions. The differential 230, which may be mechanical or hydraulic, produces its output through shaft 232. Shaft 232 may be connected to a cable or pulley arrangement suitably disposed to raise and lower the furnace electrode in accordance with furnace conditions. Alternating current motor 220 drives shaft 236 of differential 230 at substantially a constant speed. At system balance, the direct current motor 210 is operating at substantially the same revolutions per minute as the alternating current motor 220 and the output shaft 232 is not rotating, but is holding electrode 250 in a stationary position. If the magnetic amplifier output decreases, which means that the watts of the furnace 52 has increased, the direct current motor slows down and an output is produced from differential 230 through shaft 232 which raises the electrode 250. The electrode 250 raises until the furnace watts decreases to the point where the magnetic amplifier output increases, thus accelerating the direct current motor 210 back to the balance point. If the magnetic amplifier output increases, indicating the watts of the furnace 52 has decreased, the direct current motor speed increases, producing an output from differential 230 through shaft 232 in the opposite direction to the previous output, which lowers the electrode 250. The electrode 250 lowers to a point where the furnace watts increases, thus reducing the output of the magnetic amplifier 70 and dropping the revolutions per minute of the direct current motor back to the balance point.

In operation, rheostat 156 is adjusted to set the reference current $I_3$ and thus establish the watt level at which the furnace 52 will operate. In other words, rheostat 156 selects the position on the desirable operating portion of the arc kilowatt curve 24 shown in FIG. 2 that the furnace will operate. The bias rheostat 148 is also adjusted to provide the proper bias for the magnetic amplifier 70. Then the proper limiting or overriding current is selected for the particular furnace voltage used. This can be done automatically by having auxiliary contacts on the furnace transformer tap changer such that a change in taps on the furnace transformer will automatically select a contact, such as contact 202 or 204, and the contact will add the proper amount of resistance 198 to the circuit. When it is desired to start operation of the submerged arc furnace the electrodes are lowered into the furnace shell and the pieces of solidified charge and other conducting material are disposed around the electrodes to enable current to flow between electrodes and the charge is melted by arcing between the electrode and said charge. The electrodes penetrate the charge to a depth which produces the operating conditions called for by the particular resistance setting on rheostat 156 of the reference circuit. When the furnace power has increased to the desired magnitude, the signal from the Hall generator 110 will be sufficient to reduce the output signal of magnetic amplifier 70 to the point where the r.p.m. of the direct current motor 210 equals the r.p.m. of the alternating current motor 220, and the position of the electrode 250 will be stabilized at the desired depth in the charge.

If the arc furnace current reaches the limiting current determined by limiting circuit 100, the signal applied to winding 136 and 138 of magnetic amplifier 70 will override the signal applied to control windings 144 and 146 by Hall generator 110. The output of magnetic amplifier 70 will thus be reduced and the electrode 250 will rise until the operation of the furnace is back in the desired range where the signal from the Hall generator 110 will again control the operation of the furnace. When the furnace power input is at the preset value, as determined by the setting of rheostat 156, the signal produced by the difference between the watt signal $I_1$ and reference signal $I_3$ will produce a unidirectional output from magnetic amplifier 70 that will drive direct current motor 210 at the same revolutions per minute, but in the opposite direction, as the alternating current motor 220. Any change in the furnace power input from the desired value will be reflected in a corresponding change in the output of magnetic amplifier 70 and the electrode 250 will be raised or lowered, to once again obtain the desired power input to the submerged arc furnace 52. For example, if the power input to the furnace 52 increases, the signal $I_1$ will increase, reducing the output of the magnetic amplifier 70. The direct current motor 210 will slow down and the electrode 250 will be raised until the furnace power input is back to the desired value. If the furnace power decreases, the signal $I_1$ decreases, and the output of the magnetic amplifier 70 increases, speeding up the direct current motor 210 and lowering the electrode 250 until the furnace power input is back to the desired value. If the furnace operating level exceeds the predetermined desirable operating current, the limiting circuit 100 supplies a signal $I_2$ and the electrode 250 will be raised, even though the signal $I_1$ decreases and signals the electrode 250 to lower.

The schematic diagram shown in FIG. 4 illustrates an embodiment of the invention suitable for use with the direct arc type of furnace. In general, the schematic diagram shown in FIG. 4 is similar to the schematic diagram shown in FIG. 3, with like reference numerals in FIGS. 3 and 4 indicating like components. The difference between the two embodiments lies in the addition of a voltage sensitive circuit 300 and additional windings 302 and 304 on magnetic amplifier 70, for providing a signal when an electrode touches the charge. In the submerged arc furnace, this feature is not required, since the furnace operates with the electrodes submerged in the charge. In the direct arc furnace, however, the watt regulator will not start to control the operation of the furnace until two electrodes are arcing to the charge, thus providing a complete current path. With no current flowing through line 170 of arc furnace 52 there will be no signal from the watt transducer 110 and a large output will be produced by magnetic amplifier 70, increasing the speed of the direct current motor 210 and consequently the electrode 250 will be lowered. To prevent the first electrode to reach the charge from submerging in the charge, or from breaking the electrode if the charge is solid, the voltage feature 300 will raise the electrode as soon as it contacts the charge and allow it to again descend. This action is repeated until another electrode contacts the charge, at which time current starts to flow between the electrodes through the charge, and the watt transducer can then start controlling.

The voltage circuit 300 is connected to windings 302 and 304 on magnetic amplifier 70, with the voltage circuit 300 only supplying current to windings 302 and 304 when the voltage drop from one of the electrodes to the furnace shell is substantially zero, indicating that one of the electrodes has shorted to the furnace charge. This loss of voltage between an electrode and the furnace shell energizes windings 302 and 304 on magnetic amplifier 70 and causes the electrode to raise until clear of the charge.

Voltage sensing circuit 300 is responsive to the voltage from the electrode to the furnace shell through lines 306 and 308. This voltage is applied to full wave bridge rectifier 310, producing a unidirectional voltage which may be filtered in a wave filter comprising inductor 312 and capacitor 314, and applied across resistor 315 and to a semiconductor device 316, which may be a PNP junction transistor having a base electrode $b$, collector electrode $c$ and emitter $e$. The unidirectional signal applied to transistor 316 reverse biases said transistor, causing transistor 316 to be in its non-conducting or cut-off condition. Thus, unidirectional voltage source 318, which may be a battery, cannot cause current to flow through rectifier 320 and windings 302 and 304 of magnetic amplifier 70. However, when the voltage from the furnace electrode to the furnace shell falls to a very low value due to an electrode contacting the charge, the unidirectional signal produced by rectifier 310 is insufficient to keep transistor 316 in its non-conducting state, and current is allowed to flow from the battery 318, through rectifier 320, through windings 302 and 304 of magnetic amplifier 70, and through the emitter-collector junction of transistor 316. This current flow through windings 302 and 304 produces a magnetomotive force which opposes the magnetomotive force produced by the current flowing through the load windings 116 and 118, driving the magnetic core members away from saturation and reducing the output signal of magnetic amplifier 70. The reduction in output signal from the magnetic amplifier 70 causes the r.p.m. of direct current motor 210 to decrease below the r.p.m. of motor 220, causing the electrode to raise clear of the melt. When the short circuit from the electrode to the furnace charge is removed by virtue of the electrode raising, rectifier 310 again places a reverse bias on transistor 316, and current flow through windings 302 and 304 of magnetic amplifier 70 ceases. The output of magnetic amplifier 70 increases and the r.p.m. of direct current motor increases to again allow the electrode to lower toward the melt. This action continues until another furnace electrode contacts the melt allowing a current path from one electrode to another electrode through the charge to be established. When current starts to flow, the watt transducer 110 takes control and the operation of the furnace is the same as described relative to FIG. 3 and the submerged arc furnace. The overriding current control circuit 100 is even more important when used with a direct arc furnace than with a submerged arc furnace, because it is much more probable that the direct arc furnace will try to operate in the portion of the KW curve 24 past point 25, as shown in FIG. 2. However, the current limiting circuit 100 is also a safety feature and can well be utilized on submerged arc furnaces, as well as direct arc. It prevents the furnace from operating at too great a current magnitude in case something should happen to cause the watt transducer portion of the control circuit to malfunction.

It will, therefore, be apparent that there has been disclosed a new and improved regulating system for arc furnaces that utilizes a signal proportional to the circuit power as the regulating signal. Further, the regulator prevents operation of the arc furnace in the undesirable operating range where an increase in arc furnace current results in a decrease in useful arc furnace power. Also, a voltage circuit is provided on control that is to be utilized with direct arc furnaces, to prevent the electrodes of the direct arc furnace from penetrating the charge.

Since numerous changes may be made in the above described apparatus and different embodiments of the invention may be made without departing from the spirit thereof, it is intended that all matter contained in the foregoing description or shown in the accompanying drawings shall be interpreted as illustrative, and not in the limiting sense.

I claim as my invention:

1. Electrical control apparatus for controlling the position of an electrode in an electric arc furnace comprising amplifier means producing an output signal responsive to the algebraic sum of the signals applied to it, means comprising a semiconductor multiplying device adapted for connection to the electric arc furnace to obtain a control signal responsive to the product of the instantaneous current and instantaneous voltage of the electric arc furnace, said semiconductor multiplying device being connected to apply said control signal to said amplifier means, and means applying a reference signal to said amplifier means, the output signal of said amplifier means being responsive to the difference between said control signal and said reference signal.

2. Electrical control apparatus for controlling the position of an electrode in an electric arc furnace comprising amplifier means producing an output signal responsive to the algebraic sum of the signals applied to it, means comprising a semiconductor multiplying device adapted for connection to the electric arc furnace to obtain a control signal proportional to the product of the instantaneous current and instantaneous voltage of the electric arc furnace, said semiconductor multiplying device being connected to apply said control signal to said amplifier means, means applying a reference signal to said amplifier means, and means adapted for connection to the electric arc furnace for applying a limiting signal to said amplifier means when the current of the electric arc furnace reaches a predetermined magnitude, the output signal of said amplifier means being responsive to the difference between said control signal and said reference signal in the absence of said limiting signal, said output signal of said amplifier means being responsive to said limiting signal while said limiting signal is being applied to said means.

3. Electrical control apparatus for controlling the operation of an electric arc furnace comprising amplifier means producing an output signal responsive to the algebraic sum of the signals applied to it, means comprising a semiconductor multiplying device adapted for connection to the electric arc furnace to obtain a control signal proportional to the product of the instantaneous current and instantaneous voltage of the electric arc furnace, said semiconductor multiplying device being connected to apply said control signal to said amplifier means, means applying a reference signal to said amplifier means, means adapted for connection to the arc furnace for applying a first limiting signal to said amplifier means when the current of the electric arc furnace reaches a predetermined magnitude, means adapted for connection to the arc furnace for applying a second limiting signal to said amplifier means when the voltage of the electric arc furnace decreases to a predetermined magnitude, the output of said amplifier means being responsive to the difference between said control signal and said reference signal in the absence of said first and second limiting signals, the output of said amplifier means being responsive to said first limiting signal while said first limiting signal is being applied to said amplifier means, the output of said amplifier means being responsive to said second limiting signal while said second limiting signal is being applied to said amplifier means.

4. A regulator system for controlling the position of an electrode in an electric arc furnace comprising magnetically responsive means having a plurality of control windings, means adapted for connection to the arc furnace for applying a control signal to one of said control windings proportional to the instantaneous power being used by the arc furnace, means applying a reference signal to another of said control windings, means adapted for connection to the arc furnace for applying a limiting signal to another of said control windings when the arc furnace current exceeds a predetermined magnitude, means connected in circuit relation with said magnetically responsive means and adapted for raising and lowering the electrode according to the output of said magnetically responsive means, the output of said magnetically responsive means being responsive to the difference between said control and reference signals in the absence of said limiting signal, said limiting signal determining the output of said magnetically responsive means while it is being applied to said magnetically responsive means.

5. A regulator system for controlling the position of an electrode in an electric arc furnace to substantially maintain a predetermined usage of electric power by the arc furnace, comprising magnetic amplifier means having first, second and third control windings and output windings, means comprising a solid state multiplying device adapted for connection to the arc furnace for applying a control signal to said first control winding proportional to the product of the current and voltage of the arc furnace, means applying a reference signal to said second control winding, means connected in circuit relation with said magnetic amplifier means adapted for moving said electrode up and down according to the difference between said control and reference signals.

6. A regulator system for controlling the distance between an electrode and a molten pool of metal in an electric arc furnace to substantially maintain a predetermined usage of electric power by the arc furnace, comprising a magnetic amplifier having first, second, and third control windings and output windings, means comprising a Hall generator adapted for connection to the arc furnace for applying a control signal to said first control winding proportional to the product of the instantaneous voltage and instantaneous current of the arc furnace, means applying a reference signal to said second control winding, means adapted for connection to the arc furnace for applying a limiting signal to said third control winding when the arc furnace current exceeds a predetermined magnitude, means connected in circuit relation with said magnetic amplifier and adapted for moving the electrode in the direction determined by the difference between said control and reference signals, said limiting signal overriding the control and reference signals and causing said magnetic amplifier to apply a signal to the means adapted for moving the electrode which would move the electrode away from the molten pool of metal while said limiting signal is being applied to said third control winding.

7. A regulator system for controlling the arcing distance between an electrode and a pool of molten metal in an electric direct arc furnace to maintain at a substantially predetermined value the power used by the arc furnace, comprising magnetic amplifier means having first, second, third and fourth control windings and output windings, means comprising a solid state multiplying device adapted for connection to the arc furnace for applying a first control voltage to said first control winding proportional to the product of the voltage and current of the arc furnace, reference means applying a second control voltage to said second control winding, means adapted for connection to the arc furnace for applying a third control voltage to said third control winding when the arc furnace current exceeds a predetermined magnitude, means adapted for connection to the arc furnace for applying a fourth control voltage to said fourth control winding when the arc furnace voltage decreases below a predetermined magnitude, the output of said magnetic amplifier means being responsive to the difference between said first and second control voltages when no signal is applied to said third and fourth control windings, said third control voltage determining the output of said magnetic amplifier while it is being applied to said third control winding, said fourth control voltage determining the output of said magnetic amplifier while it is being applied to said fourth control winding, means connected in circuit relation with said magnetic amplifier means adapted for raising and lowering the electrode comprising a unidirectional potential motor, an alternating potential motor and differential means having input and output members, said motors being connected to said input members and rotating in opposite directions, the output member of said differential means being responsive to the difference between the revolutions per minute of said motors, the output of said magnetic amplifier means controlling the revolutions per minute of the unidirectional voltage motor.

8. An electric arc furnace system comprising an electric arc furnace, an electrode, magnetic amplifier means having first, second, and third control windings and output windings, means comprising a Hall generator connected in circuit relation with said magnetic amplifier means and said electric arc furnace for applying a first control voltage to said first control winding proportional to the product of the instantaneous voltage and instantaneous current of said arc furnace, reference means connected in circuit relation with said magnetic amplifier means applying a second control voltage to said second control winding, means connected in circuit relation with said magnetic amplifier means and said electric arc furnace for applying a third control voltage to said third control winding when the arc furnace current exceeds a predetermined magnitude, the output of said magnetic amplifier means being a polarized signal responsive to the difference between the first and second control voltages when no signal is being applied to said third control winding, said third control signal determining the output of said magnetic amplifier while it is being applied to said third control winding, means connected in circuit relation with said magnetic amplifier means adapted for raising and lowering said electrode comprising a reversible direct current motor, the output of said magnetic amplifier means controlling said reversible direct current motor to control the position of said electrode and maintain the power used by said electric arc furnace at a predetermined magnitude.

References Cited by the Examiner

UNITED STATES PATENTS

| | | | |
|---|---|---|---|
| 1,915,095 | 6/33 | Jump | 13—13 |
| 2,727,694 | 12/55 | Helmick et al. | 314—68 X |
| 2,988,650 | 6/61 | Weiss. | |
| 3,001,123 | 9/61 | Reuther et al. | |

RICHARD M. WOOD, *Primary Examiner.*

JOSEPH V. TRUHE, *Examiner.*